Dec. 12, 1967     L. S. STURLAUGSON     3,357,103

ROUTING DEVICE

Filed Oct. 21, 1965

INVENTOR

Leland S. Sturlaugson

BY *Robert E. Klewe*

ATTORNEY

United States Patent Office 3,357,103
Patented Dec. 12, 1967

3,357,103
ROUTING DEVICE
Leland S. Sturlaugson, Park River, N. Dak. 58270
Filed Oct. 21, 1965, Ser. No. 499,836
3 Claims. (Cl. 30—276)

ABSTRACT OF THE DISCLOSURE

A dehorning device adapted to be attached to a power drill, said device having a rotary blade, the blade includes a shaft having one end adapted to be attached to the power drill with a disc mounted to the other end of the shaft. The blade further includes a lateral strap portion spaced below the disc member and extending laterally across the rotational axis of the shaft and a pair of upwardly extending strap portions extending upward from the outer ends of the lateral strap portion with the upper ends of the upwardly extending strap portions attached to the disc member. The lateral strap portion and upwardly extending strap portions having cutting edges, and a spring mounted sleeve acting to limit the downward movement of the blade.

---

This invention relates to dehorning equipment, more particularly, the invention relates to dehorning equipment for dehorning young animals.

It is an object of the invention to provide a novel dehorning device having a rotary blade which may be attached to a power drill.

It is a further object of the invention to provide a novel blade for routing out the horn of young horned animals.

It is a further object to provide a novel dehorner which may be inexpensively made and may be operated with relative safety.

Further objects and advantages of the invention will become apparent as the description proceeds and when taken in conjunction with the accompanying drawing wherein.

Briefly stated, the invention comprises a blade attachment adapted to be attached to a power drill, said blade attachment comprising a rotary blade, a slidably mounted spring biased sleeve guard adapted to surround said blade and limit the depth of the cut of said blade, said blade having a stem adapted to be attached to the chuck of a conventional power drill for rotating the blade, said blade having taper cutting edges and adapted to provide a radial cut for routing out the horns of young animals, a screw on the center axis of the blade to initiate the cut.

Figure 1:
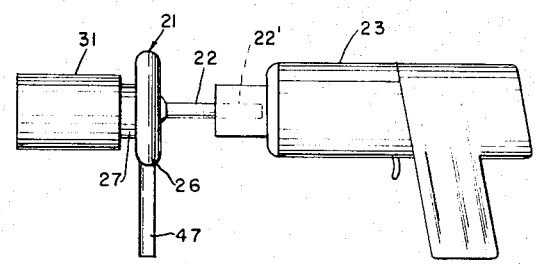
FIGURE 1 is a side elevational view of the dehorning device shown installed in a power drill.

Referring more particularly to the drawing, in FIGURE 1, the routing dehorning device 21 is illustrated having a stem 22 which is attached to a power drill 23 at its rear end 22′ in a conventional manner.

The routing dehorning device 21 has a housing 25, with an enlarged annular ring portion 26. Beneath the annular ring portion 26 is a reduced cylindrical shoulder 27 formed integrally with the annular ring portion. The annular ring 26 and shoulder 27 may be made of plastic. A second cylindrical shoulder 28 formed of metal, has a collar portion 29 of metal which projects upward into the shoulder 27 and the ring 26, to press fit the shoulder 28 and collar 29 to the shoulder 27 and ring 26.

A coil spring 30 annularly surrounds the second shoulder 28. A plastic cylindrical sleeve guard 31 surrounds the coil spring and the shoulders 27 and 28. The sleeve guard 31 has an annular inner ridge 32 which abuts the lower edge 30′ of the coil spring 30 to urge the guard downward.

The shoulder 28 has a C-shaped metal ring or flat spring clip 33 which is fitted into an annular notch in the shoulder 28 and which ring engages the ridge 32 to limit the downward movement of the guard 31 relative to the housing 25.

The rotary blade 34 of the dehorning device comprises an annular disc 35, which is fixed to the outer end of the stem 22, in co-axial relation. The stem 22 extends through a center bore 23 in the shoulder 28 and the center bore 23′ in the collar 29. An oil impregnated graphic ring or any other suitable bearing ring 36 surrounds the stem 22 between the disc 35 and the shoulder 28. A second graphic ring or bearing ring 37 surrounds the stem 22 at the upper end of the collar 29, with a conventional C-shaped metal ring or flat spring clip 38 is fitted into notches in the stem 22 immediately above the ring 37 to lock the stem 22 from sliding axially relative to the housing, but enabling the stem as well as the rotary blade 34 to rotate relative to the housing.

Depending downward from the annular disc 35 of the rotary blade 34 are two frusto-conical wall plates or sections 39 and 40 mounted on opposite edges of the disc 35. The leading edges 39′ and 40′ of the sections 39 and 40 are sharpened to form lateral cutting edges for the rotary blade 34.

An elongated cutting plate 41 is fixed across the lower ends of the wall sections 39 and 40. The cutting plate 41 has a downwardly extending cutting surface 42 which extends downward at an angle along one radial edge 41′ of the cutting plate. The cutting plate 41 also has similarly downward extending surfaces 42′ and 42″ which extend downward at an angle and are tapered to form cutting edges.

The surface 42′ is triangular in shape and the surface 42″ extends outward from a metal auger screw 43, which screw is fixed axially to the cutting plate 41. Along the opposing radial edge 41′ of the cutting plate 41 is another triangular cutting edge blade surface 44 which extends downward at the same angle as the triangular surface 42′ in the opposite direction and is tapered to form a cutting edge.

Operation

Figure 2:
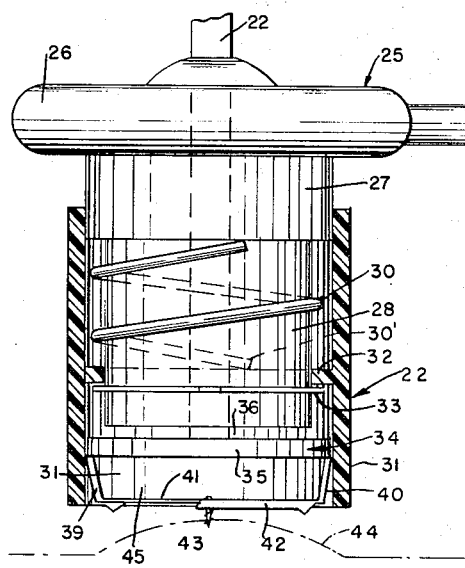
FIGURE 2 is an enlarged cut away view of the dehorning device about to rout out a horn of an animal.

The routing dehorner device is operated by energizing the power drill 23 which causes the stem 22 and the rotary blade 34 to rotate, including the wall sections 39 and 40 and the cutting plate 41. The screw 43 will be placed centrally on the horn 46 or horn cells of the young animal to be dehorned as illustrated in FIGURE 2. The operator may hold the power drill with one hand and grasp the ring 26 of the housing 25 or the operator may grasp the handle 47, which extends from the ring to prevent any possibility of the housing rotating with the stem and cutting blade.

Figure 3:
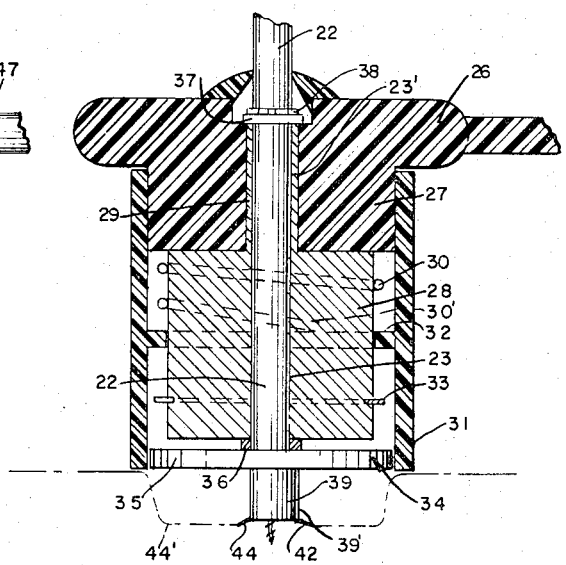
FIGURE 3 is an enlarged side view with a further cut away showing of the dehorning device, showing the dehorning device in its operative position after the horning routing operation.
Figure 4:
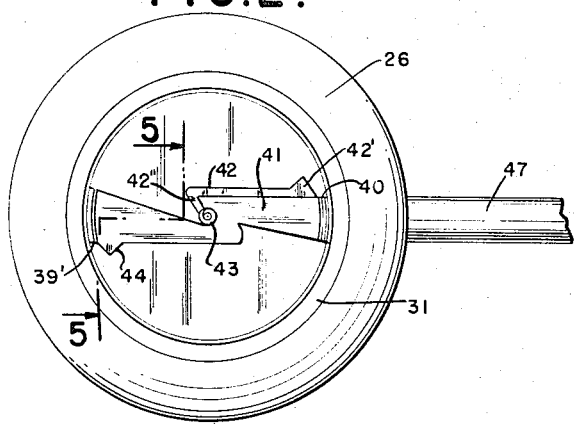
FIGURE 4 is a front end view of the dehorning invention.
Figure 5:
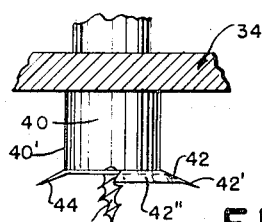
FIGURE 5 is a cross-sectional view taken along line 5—5 of FIGURE 4.

The screw 43 will drill into the horn 46 until the cutting edges 42, 42′, 42″, and 44 begin to rout the bone and thereupon these cutting edges will also begin to cut into the bone. The operator throughout the cutting operation will continue to press the cutting plate against the bone. As the cut becomes deeper, the lateral cutting edges 39′ and 40′ will also cut into the bone until an annular recess 44′ is formed as illustrated in FIGURE 3. As the blade moves in deeper into the animal from its initial position illustrated in FIGURE 2 to its final position illustrated in FIGURE 3, the guard 31 will be gradually pushed back to its position illustrated in FIGURE 3.

When the routing or cutting operation is completed as illustrated in FIGURE 3, the cutting blade 34 will be removed from the animal which will enable the guard 31 to spring back to its position illustrated in FIGURE 2.

The empty space 45 between the disc 35 and the cutting plate 41 provides an area for the bone particles as they are cut out by the rotary blade to move or be deposited.

Thus, it will be seen that a rapid routing or cutting device for cutting out the horns of animals has been provided.

The invention is intended to be used for removing the horn or cornual cells and the immediately adjacent epithelial tissue from the polls of young horned animals by the rotating blade. Different size cutting blades may be used for different size horns.

The routing invention provides maximum safety since the rotating blade exposure is governed by the guard 31 so that only the required depth of cutting is allowed, regardless of the amount of pressure applied. Also, the guard surrounds the cutting edges at all times except when the blade is embedded in the tissues of the horn and the surrounding skin areas.

Also, the cutting blade construction minimizes the danger of lateral movements of the tool. The tool has other advantages in that no caustic chemicals are involved to produce accidental damage to tissues other than the target area. Also, the frontal sinuses will not be exposed when utilizing this dehorning invention.

The guard 28 is provided to avoid cutting into the bony portion of the skull to any great extent. Most of the tissue routed out will be horn cells and skin, as the guard 28 controls the depth of the cut.

With this dehorning invention the horn cells can be routed out from young animals, from the time the horn can be first located to several months later, and with this routing dehorning invention the horn cells may be eliminated so that only one dehorning operation may be necessary in many cases.

It will be obvious that various changes and departures may be made to the invention without departing from the spirit and scope thereof and accordingly it is not intended that the invention be limited to that specifically described in the specification or illustrated in the drawing, but only as set forth in the appended claims wherein:

What is claimed is:

1. A dehorning device adapted to be attached to a power drill, said device comprising a rotary blade, said blade having an elongated shaft forming a stem with one end of said stem adapted to be attached to a power drill, said blade having an annular disc mounted coaxially to the other end of said stem and an elongated strap portion spaced below said disc portion and extending laterally across the rotational axis of said stem and disc, a pair of upwardly extending strap portions extending upwardly from the opposing outer edges of said strap portion with the upper ends of said upwardly extending strap portions fixed to said disc member, said laterally extending strap portion and upwardly extending strap portions having cutting edges with the cutting edges of said laterally extending strap portion inclined downward away from the one end of said stem, a slidably mounted spring biased sleeve adapted to surround said blade and limit the depth of the cut of said blade, a screw mounted on the center axis of said lateral strap portion to initiate the cut of said blade.

2. A dehorning device according to claim 1 wherein a handle is mounted to extend the sleeve and extends laterally away from said stem for the operator to grasp to facilitate operating said device.

3. A dehorning device adapted to be attached to a power drill, said device comprising a rotary blade, said blade having an elongated shaft forming a stem with one end adapted to be attached to a power drill, a lateral support mounted to the other end of said shaft, an elongated strap portion spaced below said lateral support and extending laterally across the rotational axis of said stem, a pair of upwardly extending strap portions extending upwardly from the outer edges of said lateral strap portion with the upper ends of said upwardly extending strap portions attached to said lateral support, said lateral strap portions and upwardly extending strap portions having cutting edges, with a guard means slidably mounted to said blade and limiting the depth of said cut.

References Cited

UNITED STATES PATENTS

| | | | |
|---|---|---|---|
| 881,856 | 3/1908 | Hagstrom et al. | 145—116 |
| 1,313,709 | 8/1919 | McKoy et al. | 144—2 |
| 2,372,398 | 3/1945 | Shoffner | 77—55 |
| 2,409,377 | 10/1946 | Miller | 77—55 |
| 2,576,786 | 11/1951 | Gray et al. | 77—55 |

JAMES L. JONES, JR., *Primary Examiner.*